United States Patent [19]

Becker

[11] 4,414,555

[45] Nov. 8, 1983

[54] METHOD AND APPARATUS FOR REPLENISHING MARKING MATERIAL TO A DONOR RIBBON IN A THERMAL MARKING PRINTER SYSTEM

[75] Inventor: Horace W. Becker, Pittsford, N.Y.

[73] Assignee: Xerox Corporation, Stamford, Conn.

[21] Appl. No.: 375,772

[22] Filed: May 7, 1982

[51] Int. Cl.$^3$ .................... G01D 15/10

[52] U.S. Cl. .................... 346/76 PH

[58] Field of Search .................... 346/76, 140, 75

[56] References Cited

U.S. PATENT DOCUMENTS 3,719,261 3/1973 Heinzer et al. .................... 197/1 R 4,268,368 5/1981 Aviram et al. .................... 204/181 C 4,359,748 11/1982 Pasini et al. .................... 346/76 PH

FOREIGN PATENT DOCUMENTS 49-26245 7/1974 Japan .

*Primary Examiner*—Donald A. Griffin

[57] ABSTRACT

A thermal printing system is disclosed wherein an inked ribbon, wound between two rollers, is transported through a thermal printing zone where a selectively heated thermal head contacts the ribbon. Discrete ink segments on the ribbon are fluidized and transferred to a recording sheet in image configuration. Upon completion of a print cycle, an ink-replenishing mechanism is brought into contact with the inked surface and the ribbon is rewound onto a feed roll. At the completion of the ink replenishing step, the normal print operation is resumed.

1 Claim, 3 Drawing Figures

METHOD AND APPARATUS FOR REPLENISHING MARKING MATERIAL TO A DONOR RIBBON IN A THERMAL MARKING PRINTER SYSTEM

BACKGROUND AND PRIOR ART STATEMENT

The present invention relates to a thermal marking printer and, more particularly, to an improved method for replenishing marking material on a donor ribbon utilized in such a printer.

Thermal printers have found increasing use in a variety of printing applications such as facsimile, printer-plotters and computer output printers. As office automation increases, low cost thermal printers appear as prime candidates for communicating terminals to provide office-quality, hard-copy outputs. The main advantages of such printers are reliability, quietness, clean operation, compactness, speed and low cost.

Thermal printers fall into two broad functional categories: direct and transfer. In the direct system, a paper having a thermally sensitive coating (either wax or an organic metal compound) is selectively heated causing color changes in the coating. This type of system has not found wide acceptance due to the cost of the coating and the unpleasant feel and appearance of the coating materials.

In the transfer type of printer a donor ribbon loaded with a marking material, typically a heat-sensitive ink, is transported intermediate a thermal print head and a plain paper recording sheet. The print head is electrically activated to selectively apply heat to the donor sheet causing melting and transfer of portions of the marking material onto the paper in an image configuration. This system does not have the disadvantages associated with the direct transfer papers but does have additional problems which have hitherto not been completely resolved. One problem has been the replenishment of the marking material on the donor ribbon in an efficient manner.

One prior art technique is disclosed in U.S. Pat. No. 3,719,261. As shown in FIG. 5, an endless tape 20 coated with a conductive ink, passes between a printing head 40 and a recording paper 51. Printing head 40 is energized and produces electrical currents within the ink layer on tape 20 causing localized heating and transfer of the ink to the paper. The ink is continually replenished on tape 20 by passing the tape through an ink reservoir 30 continually kept in a molten state by heating resistors 32. A similar reinking method is disclosed in U.S. Pat. No. 4,268,368. The main disadvantage to this type of marking renewal is the requirement to continually maintain the ink in heated form. The energy requirements add considerably to the cost of such a system.

A variation of this type of system which is subject to the same disadvantages is disclosed in Japanese Publication 49-26245. In this system, as shown in FIG. 2, an endless ink ribbon 1 passes between heat hammer 3 and recording paper 10. The heat hammers are energized to selectively heat the back of ribbon 1 causing localized melting and transfer of the ink layers onto paper 10. Following the print operation, the ink film passes through a reinking station comprising melting roller 4 and ink reservoir 6. Roller 4 applies heat through film 1 to reservoir 6 causing a portion of the ink wick to melt onto the surface of the ink film thereby replenishing the previously depleted portion. Roller 7 adjusts the thickness of the newly applied ink coating. This system is also energy inefficient in that it requires heating roller 4 to be constantly energized. In addition, the print operation is conducted in an intermittent fashion resulting in uneven distribution of the ink at the re-inking station.

The present invention is therefore directed to a more efficient donor replenishing system which does not require a continuously energized recoating station. More particularly, the invention relates to an apparatus for applying an ink coating to depleted areas of a ribbon used in a thermal transfer operation, the apparatus comprising:

- an ink transfer ribbon connected between two feed rollers,
- means for advancing, during a print cycle, the ink-coated ribbon through a thermal printing station in a first direction, said ribbon being wound around a first feed roller acting as a take-up roller,
- an ink applicator positioned adjacent the ribbon path, said applicator out of contact with said ribbon during said print cycle,
- means for periodically reversing the direction of said ribbon during a non-print cycle so that the ribbon is rewound on said second roller, means for causing said ink applicator to come into contact with the ink-depleted ribbon surface during a time coincident with said reversed ribbon travel, whereby a uniform ink coating is applied to said surface, and
- means for reactuating said ribbon advancing means coincident with initiation of the next print cycle.

DRAWINGS

DESCRIPTION

Figure 1:
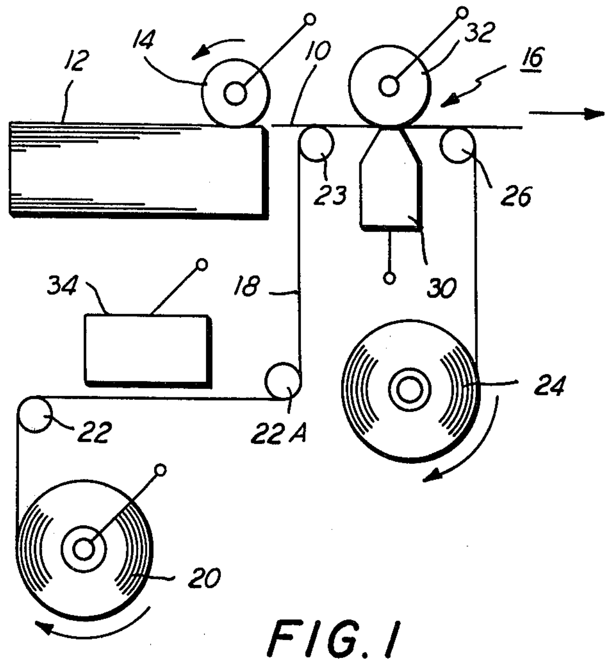
FIG. 1 shows in schematic form a thermal transfer printing system utiliziing a periodically actuated ink replenishing station.

FIG. 1 illustrates a thermal printing system according to the present invention. A recording sheet 10, is fed from the top of a supply tray 12 by means of feed roller 14, into a thermal printing zone generally designated as 16. An ink transfer ribbon 18, consisting of a heat-sensitive ink layer formed on a thin film substrate, is fed from feed roller 20, passes over tensioning rollers 22, 22A, 23, proceeds through printing zone and is wound around take-up roller 24 via another tensioning roller 26. Printing zone 16 is defined by a thermal print head 30 and opposed back-up roller 32. A re-inking apparatus 34 is disposed adjacent to a portion of the ribbon surface, the apparatus adapted to periodically replenish depleted areas of the ribbon as will be seen below.

As is known to those skilled in the art, the printing face of thermal printheads comprise a matrix of individually addressable, resistive islands. Upon receipt of input signals from a remote source, corresponding to information to be printed, selected islands are heated. When the print head face is brought into contact with the back of the inked ribbon in printing zone 16, localized heating and melting of the normally solid ink layer occurs. This fluidized ink is transferred to the recording sheet 10, forming an image thereon. As will be appreciated, the ink thus transferred leaves depleted regions on ribbon 18. The method and apparatus for replenishing these depleted ink regions is disclosed in the following operational description of the system.

Figure 2:
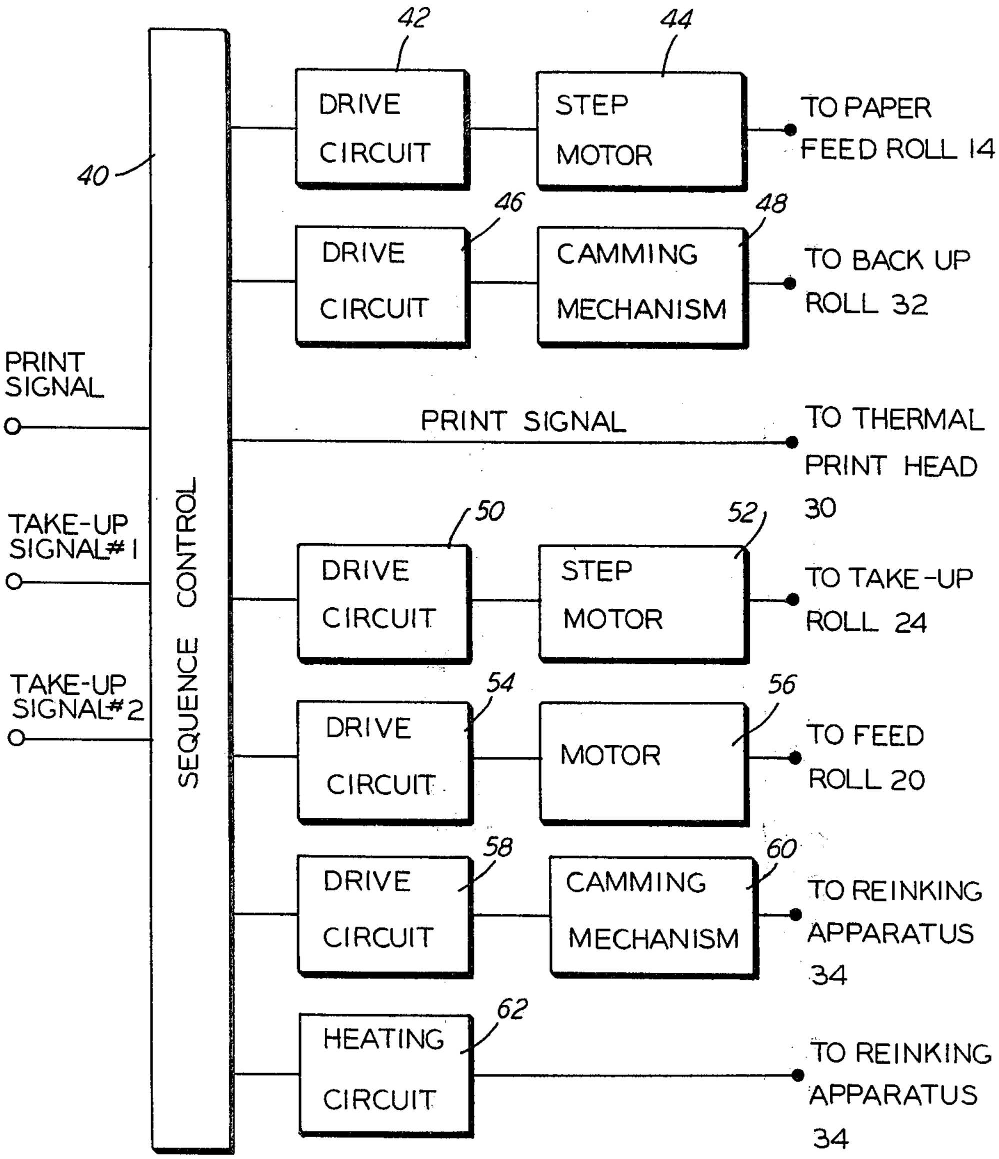
FIG. 2 shows an electrical schematic block diagram of the control system for controlling the sequential operation of FIG. 1 system.

FIG. 2 shows an electrical schematic in block diagram form of a control system for controlling the operation of various electrically activated components shown in FIG. 1.

Circuit 40 is a sequence controller which, in conjunction with receipt of a print signal, sequentially controls the following:

(1) a drive circuit 42 for energizing a step motor 44 which drives paper feed roll 14;

(2) a drive circuit 46 which energizes a camming mechanism 48 to urge back-up roll 32 into and out of printing contact;

(3) a drive circuit 50 for energizing a step motor 52 which drives take-up roller 24;

(4) a drive circuit 54 for energizing motor 56 for driving feed roller 20 in a take-up direction;

(5) a drive circuit 58 for energizing a camming mechanism 60 to bring re-inking apparatus 34 into contact with the ink ribbon;

(6) a heating circuit 62 which provides an ink heating signal to re-inking apparatus 34.

The additional inputs to controller 40 are print signals from the remote source, a take-up signal #1 indicating that a ribbon has been completely wound on take-up roll 24, and a take-up signal #2 indicating that a re-inking cycle is completed. These latter signals may be generated by a sensor detecting the width of the take-up roll, a mechanically actuated switch, or the like.

Referring to FIGS. 1 and 2, upon initiation of a print cycle, a sheet of paper 10 is removed from tray 12 by means of feed roll 14. Feed roll 14 is driven in the indicated direction by step motor 44. The paper advances into print zone 16. A portion of the inked ribbon 18 has been advanced into the print zone by the take-up roll 24 operated by step motor 52. Back-up roller 32 is moved by camming mechanism 48 to apply slight contact between sheet 10, the inked surface of ribbon 16 and the print head 30. Coincident with this operation; a print signal is applied to print head 30 selectively energizing the resistive islands on the print head and causing localized heating and fluidization of the ink. The fluidized ink is thus transferred to the sheet 10. Roller 32 is cammed out of contact position, sheet 10 continues to move through zone 16, a fresh portion of ribbon 16 is advanced and the print operation is repeated until sheet 10 has been completely marked with the information contained in that particular series of print signals. Subsequent sheet recordings may occur during the same print cycle. At some point in the operative cycle, a take-up signal is generated and sent to controller 40 indicative of the fact that the ribbon supply is completely unwound from feed roll 20. Upon receipt of this signal, controller 40 simultaneously causes the following action:

(1) Deenergizes drive circuits 42, 46, 50, and 58;

(2) Energizes heating circuits 62.

Figure 3:
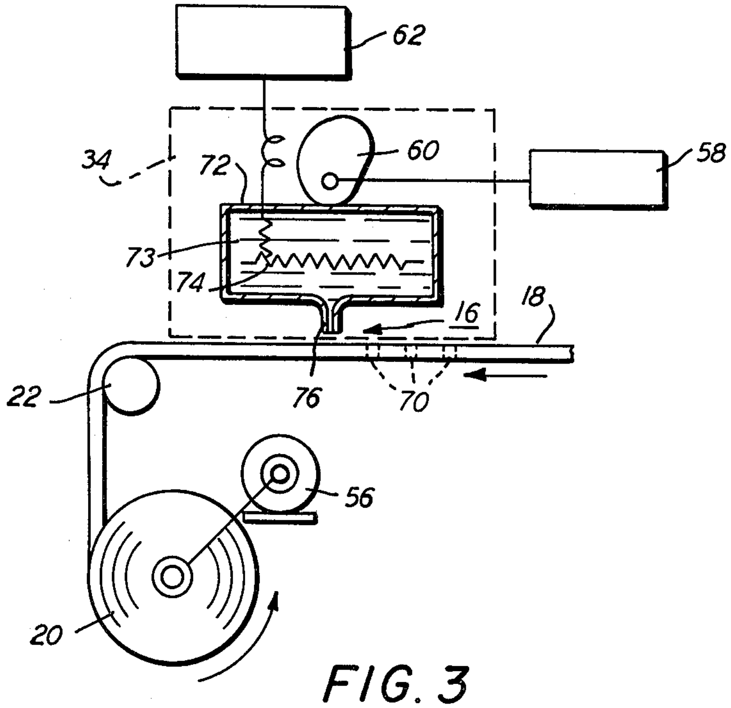
FIG. 3 shows a specific ink replenishment assembly embodiment.

As a result of these operations, feed roller 20 begins to operate as a take-up roller. Re-inking mechanism 34 is moved into replenishing contact with the ink surface of ribbon 16. Mechanism 34, in general, may be any device which contains a reservoir of thermally fusible ink, means to selectively fluidize the ink and dispensing means which serves to provide an even flow of the heated, fluidized ink onto an adjacent planar surface. One such means is shown in FIG. 3. In this figure, ink ribbon 16 is shown with exaggerated dimensions to illustrate the depleted regions 70 of the ribbon. The ribbon is now moving in the indicated direction as take-up roll rotates in a counterclockwise direction under the control of motor 56. Replenishing mechanism 34 comprises an ink reservoir housing 72 filled wih a quantity of thermally fusible ink 73. The ink is fluidized by connecting the output of heating circuit 62 to heating coils 74 within housing 72. Housing 72 has, at its lower extremities, a doctor blade 76 with an aperture at the end thereof. Cam 60 is centrally located on the top of housing 72 and, upon actuation of a signal from circuit 58, applies a downward force to housing 72 and hence to doctor blade 76 so that blade 76 contacts the surface of ribbon 16. The ink 75, now fluid, is deposited by blade 76 into the depressions 70 formed at each of the depleted areas of the ribbon. As the replenished ribbon continues to be taken up, there is provided a sufficient distance between blade 76 and roller 20 so that the ink can solidify.

This ribbon take-up and replenishing process continues until a second signal is generated indicating that the ribbon is completely rewound on the feed roll 20. Upon receipt of this second signal, controller 40, reenergizes drive circuits 42, 46 and 50, deenergizes circuits 58 and 60 and normal print operation is restored.

The advantages of the above system will readily be appreciated. Print operation continues uninterrupted for the duration of the ribbon take-up cycle. Heating cycle 62 is deenergized during this time since no standby heating source is required. The re-inking apparatus is enabled only at infrequent intervals, thereby conserving energy and providing an efficient system.

What is claimed is:

1. Apparatus for applying an ink coating to depleted areas of a ribbon used in a thermal transfer operation, the apparatus comprising:

an ink transfer ribbon connected between two feed rollers, means for advancing, during a print cycle, the ink-coated ribbon through a thermal printing station in a first direction, said ribbon being wound around a first feed roller acting as a take-up roller, an ink applicator positioned adjacent the ribbon path, said applicator out of contact with said ribbon during said print cycle, means for periodically reversing the direction of said ribbon during a non-print cycle so that the ribbon is rewound on said second roller, means for causing said ink applicator to come into contact with the ink-depleted ribbon surface during a time coincident with said reversed ribbon travel, whereby a uniform ink coating is applied to said surface, and means for reactuating said ribbon advancing means coincident with initiation of the next print cycle.

* * * * *